July 26, 1938.　　　T. E. CASSEY　　　2,124,541

ELECTRICAL OUTLET BOX AND CLAMP

Filed Oct. 14, 1937

INVENTOR
THOMAS E. CASSEY
BY
*Ransom K. Davis*
ATTORNEY

Patented July 26, 1938

2,124,541

UNITED STATES PATENT OFFICE 2,124,541

ELECTRICAL OUTLET BOX AND CLAMP

Thomas E. Cassey, Chevy Chase, Md.

Application October 14, 1937, Serial No. 168,930

1 Claim. (Cl. 247—21)

(Granted under the act of March 3, 1883, as amended April 30, 1928; 370 O. G. 757)

This invention relates to an improved means for mounting boxes or other fitting on a wall, and more particularly, for mounting electrical outlet boxes made of phenolic resinoid material or other materials having similar properties.

A further feature of this invention is to provide means for mounting the outlet boxes so that they are out of actual contact with the supporting wall or surface and are not permanently secured or bolted to a rigid surface such as a ship's bulkhead, thereby eliminating strains in the box incident to bolting the box to the bulkhead with the attendant increased liability to rupture under shock.

A further feature is to make the box quickly replaceable whenever desired for any reason.

With the foregoing and other objects in view, the invention consists in the construction, combination and arrangement of parts, as will be described more fully hereafter.

Figure 1:
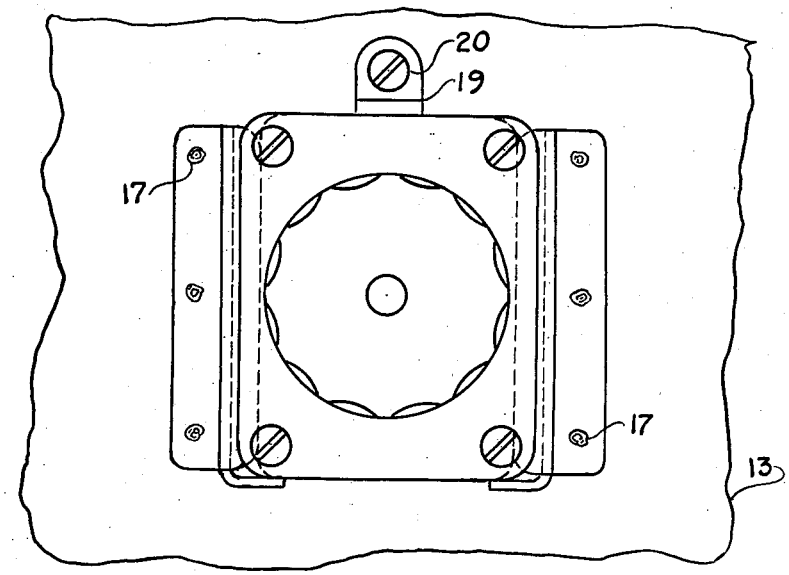
Figure 1 is a plan view of an outlet box mounted according to the preferred form of this invention.
Figure 2:
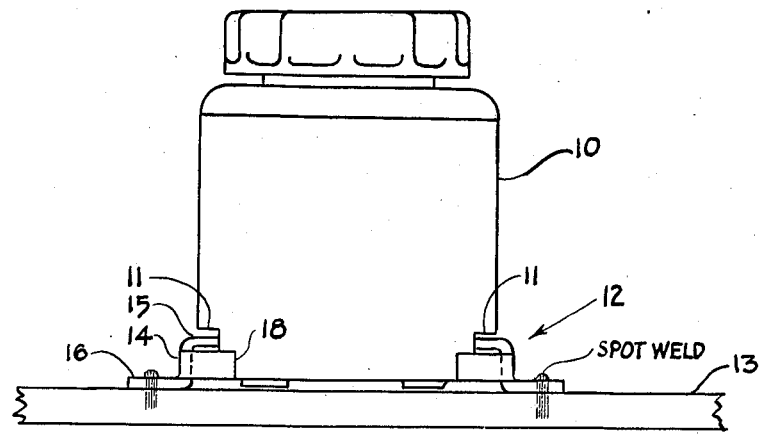
Fig. 2 is a view in elevation from the lower side of Fig. 1.

There is shown at 10 an electrical outlet box or other fitting conventional in form except that it is provided with a pair of longitudinal slits 11 on the opposite sides thereof adjacent to and parallel to the bottom and in the same plane. A pair of substantially Z shaped clamps 12 are mounted on the wall or other supporting surface 13, the connecting leg 14 of the Z clamp being preferably at right angles to the parallel upper and lower 15 and 16 feet. The Z clamps 12 are secured to the wall 13 with their upper feet 14 pointing toward each other, the legs 14 being spaced apart a distance substantially equal to or slightly greater than the width of the box 10, the length of the legs being somewhat greater than the distance between the slits 11 and the bottom of the box 10. The lower feet pointing away from each other are permanently secured to the wall 13, preferably, in the case of a metal wall, by spot welding, as at 17. At one end of the Z clamps 12, stop members 18 are provided consisting of tongues of metal turned inwardly to obstruct the box as it is slid over the feet 15 in being mounted, it being understood, however, that one of the stops 18 may be omitted, if desired.

The box may be locked in position by means of an angle 19 held against the upper end thereof by a screw 20 threaded into the wall 13.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

Means for securing a frangible electrical outlet box or fitting to a supporting surface normally subject to vibration and shock, said means comprising a pair of clamps, each clamp having parallel upper and lower feet extending in opposite directions and connected together by a leg normal thereto, the outlet box being provided with slots on opposed sides thereof adapted to receive the upper feet of the clamps, said slots being spaced from the bottom of the box a distance less than the height of the normal legs of the clamps whereby the box is held in spaced relation to the supporting surface.

THOMAS E. CASSEY.